Patented Feb. 4, 1936

2,029,642

UNITED STATES PATENT OFFICE 2,029,642

METHOD OF MAKING SECONDARY AROMATIC AMINES

Waldo L. Semon, Silver Lake Village, Ohio, assignor to The B. F. Goodrich Company, New York, N. Y., a corporation of New York No Drawing. Application June 23, 1933, Serial No. 677,273

14 Claims. (Cl. 260—128)

This invention relates to the manufacture of secondary aromatic amines, and particularly of diaryl arylene diamines. Such amines have heretofore been prepared by the condensation of an appropriate phenol with a suitable primary aromatic amine, and this general method is still the most convenient one for the preparation of a large number of secondary amines. However, the raw materials necessary to the practice of this method are in many instances necessarily prepared in an aqueous medium in which they are quite soluble. The separation of these soluble raw materials from their aqueous solution has caused serious difficulties which have rendered the raw materials quite expensive and therefore made the price of the final secondary aromatic amines exorbitant.

The chief object of this invention is accordingly to provide a method for preparing secondary aromatic amines which obviates the necessity of isolating the raw materials or intermediate products in a pure condition. Another object is to provide a method for preparing secondary aromatic amines in a simple and inexpensive manner. Other objects will be apparent from the description of the invention.

The invention, in brief, consists in first preparing a salt or addition product of a phenol and an amine and then condensing the phenol and amine to a secondary amine. In its preferred form it includes preparing one of the raw materials for the final secondary amine (either a primary amine or a phenol) in solution in a suitable solvent, adding the other raw material to precipitate a phenol-amine salt, and heating the salt to cause it to condense to a secondary amine. This invention will best be understood by reference to certain specific examples, which, however, are not to be taken as limiting the scope of the invention, but merely as explanatory thereof.

Example 1.—Diphenyl p-phenylene diamine is readily prepared by the reaction of aniline with hydroquinone under suitable conditions, but has heretofore been unduly expensive, because of the high cost of hydroquinone. The hydroquinone is ordinarily prepared by reduction of quinone in an aqueous solution and is very difficult to separate from the solution and purify. Previous expedients such as extraction with ether or ligroin and subsequent recrystallization have been wasteful, troublesome and otherwise unsatisfactory and have contributed largely to the high cost of the hydroquinone.

In accordance with this invention the hydroquinone is prepared in any usual manner in aqueous solution, and aniline is then added to the clear solution in a quantity such that approximately two molecules of aniline are present for every molecule of hydroquinone. The aniline salt of hydroquinone is thereby precipitated in almost quantitative yield, is filtered and is washed to remove inorganic salts. The hydroquinone-aniline salt is then placed in an autoclave with a further quantity of aniline equal to that used in the precipitation, and if desired a small quantity of aniline hydrochloride or hydrochloric acid as a catalyst. The contents of the autoclave are heated to a temperature of 250 to 300° C. for several hours, the water formed being blown off every half hour or hour through a condenser to recover escaping aniline vapors. The product is then vacuum distilled, the light fractions containing aniline and p-phenylaminophenol being saved and returned to the autoclave in a subsequent batch. The diphenyl p-phenylene diamine is distilled as an intermediate fraction in a high degree of purity and in a good yield.

If it is desired to prepare p-phenylaminophenol the process is carried out as described above, except that the excess of aniline is omitted and the p-phenylaminophenol is separated from the product by fractional distillation.

The dinaphthyl p-phenylene diamine may be prepared in a similar manner by precipitating the hydroquinone with an excess of alpha or beta naphthylamine and heating the precipitate to cause the desired condensation to take place.

Example 2.—Di-beta-naphthyl p-phenylene diamine is ordinarily prepared by condensing beta-naphthol with p-phenylene diamine. In accordance with this invention the p-phenylene diamine is prepared in the usual way, say by reducing either p-nitraniline or p-aminoazobenzene with iron borings and hydrochloric acid. The solution is then neutralized and filtered to remove the iron oxide, and if p-aminoazobenzene was used as the raw material, is steam distilled to remove free aniline. The filtered solution is then treated with an excess of finely powdered beta-naphthol, say three mols to each mol of p-phenylene diamine, whereupon the p-phenylene diamine is quantitatively precipitated as its beta-naphthol salt, along with the excess naphthol. The precipitate is filtered from the cool liquid and transferred to a kettle equipped with a reflux condenser, heated slowly to 300° C. and maintained at this temperature for two hours. The product is then cooled and ground to a fine powder, which is stirred into about double its volume of alcohol, filtered and washed with alcohol to remove the last traces of naphthol. The product is obtained in almost quantitative yield and approximately 100% pure. The excess naphthol may be recovered from the alcohol solution by distilling off the alcohol.

*Example 3.*—p-amino dimethylaniline is prepared by reducing p-nitroso dimethylaniline with iron and hydrochloric acid. The solution is neutralized and filtered to remove iron oxide, and an excess of beta-naphthol is added to precipitate the naphthol salt of p-aminodimethylaniline. The precipitated salt is filtered off along with the excess naphthol and is placed in a kettle equipped with a reflux condenser and heated to a temperature of 200 to 250° for two hours. The product is then fractionally distilled in a vacuum. The desired product p-dimethylamino phenyl beta-naphthylamine distils between 210 and 270° at a pressure of about 6 mm. of mercury. The lighter fractions consisting chiefly of the excess naphthal may be returned to the next batch.

It is evident that salts of other phenols with other amines than those specifically recited above may be advantageously prepared as a preliminary step in the condensation of phenols and amines to produce secondary amines. For example, any of the following phenols may be employed to form typical salts with the following amines or vice-versa, the salts then being converted into the corresponding secondary amines:

| Phenols | Amines |
| --- | --- |
| Phenol. | Aniline. |
| Cresols. | Toluidines. |
| Xylenols. | Xylidines. |
| Thymol. | Cumidines. |
| Carvacrol. | Xenylamine. |
| Phenyl phenols. | Naphthylamines. |
| Naphthols. | Diamino benzenes. |
| Nitrophenols. | Benzidine. |
| Chlorphenols. | Diamino naphthalenes. |
| Guaiacol. | p-amino diphenylamine. |
| Catechol. | p-amino dimethylaniline. |
| Resorcinol. | Diamino diphenylmethane. |
| Hydroquinone. | Diamino diphenyl ether. |
| Pyrogallol. | Anisidines. |
| Dihydroxy biphenyls. | Phenetidines. |
| Dihydroxy naphthalenes. | Nitranilines. |

The condensation reaction may be carried out at atmospheric pressure or under a higher pressure, in the presence or absence of a catalyst such as iodine, zinc chloride, hydrochloric acid, sulphuric acid and the like, and with or without an excess of one or the other of the ingredients. The precise conditions to be observed in each case will be determined by the nature of the particular ingredients used, as will be obvious to any skilled chemist.

This application is a continuation in part of my co-pending application Serial No. 301,439 filed August 22, 1928, now Patent No. 1,942,838.

I claim:

1. The process which comprises seperately forming a salt of a phenol and a primary aromatic amine, and heating the salt to cause its condensation to produce a secondary amine.

2. The process which comprises precipitating a salt of a phenol and a primary aromatic amine from an aqueous solution, and heating the salt to cause its condensation to produce a secondary amine.

3. The process which comprises preparing a salt of a phenol and a primary aromatic amine by preparing one constituent of the salt in an aqueous solution and adding the other constituent to precipitate the salt, and then heating the salt to cause its condensation to produce a secondary amine.

4. The process which comprises preparing a primary aromatic amine in an aqueous solution, adding a phenol to precipitate the amine as a phenol-amine salt, and heating the salt to cause its condensation to produce a secondary amine.

5. The process which comprises preparing a primary aromatic amine in an aqueous solution, adding a naphthol to precipitate the amine as a naphthol amine salt, and heating the salt to cause its condensation to produce a secondary amine.

6. The method which comprises preparing a primary aromatic diamine in aqueous solution, adding a phenol to precipitate the amine as a phenol-amine salt, and heating the salt to cause its condensation to produce a secondary amine.

7. The method which comprises preparing a primary aromatic diamine in aqueous solution, adding a naphthol to precipitate the amine as a naphthol-amine salt, and heating the salt to cause its condensation to produce a secondary amine.

8. The method which comprises preparing p-phenylene diamine in an aqueous solution, adding a naphthol to the clear solution to precipitate the p-phenylene diamine as its naphthol salt, and heating the salt to cause its condensation to dinaphthyl p-phenylene diamine.

9. The method which comprises preparing a phenol in an aqueous solution, adding a primary aromatic amine to precipitate the phenol as a phenol-amine salt, and heating the salt to cause its condensation to produce a secondary amine.

10. The method which comprises preparing a poly-hydroxy benzene in an aqueous solution, adding a primary aromatic amine to precipitate the poly-hydroxy benzene as its amine salt, and heating the salt to cause its condensation to produce a secondary amine.

11. The method which comprises preparing hydroquinone in an aqueous solution, adding a primary aromatic amine to precipitate the hydroquinone as its amine salt, and heating the salt to cause its condensation to produce a secondary amine.

12. The method which comprises preparing hydroquinone in an aqueous solution, adding aniline to precipitate the hydroquinone as its aniline salt, and heating the salt to cause its condensation to produce a secondary amine.

13. The method which comprises preparing hydroquinone in an aqueous solution, adding aniline to precipitate the hydroquinone as its aniline salt, and heating the mixture of the aniline and the hydroquinone-aniline salt to cause its condensation to p-phenylaminophenol.

14. The method which comprises preparing hydroquinone in an aqueous solution, adding aniline to precipitate the hydroquinone as its aniline salt, adding a further quantity of aniline to the salt, and heating the mixture of the aniline and the hydroquinone-aniline salt to cause its condensation to diphenyl p-phenylene diamine.

WALDO L. SEMON.